Patented May 11, 1937

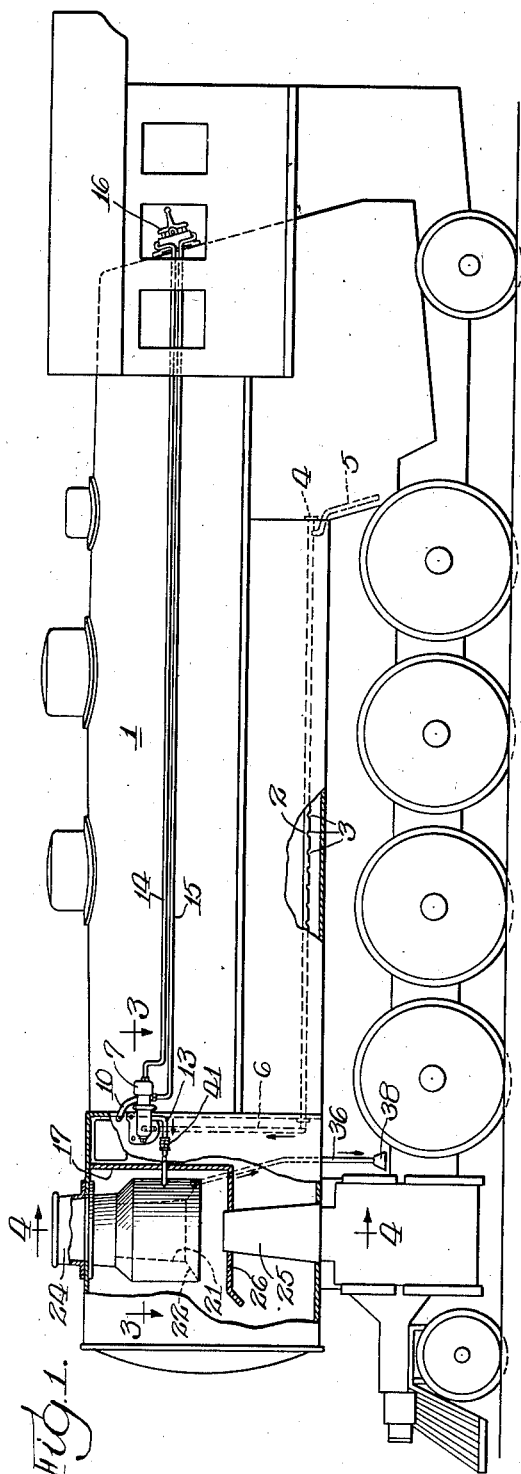

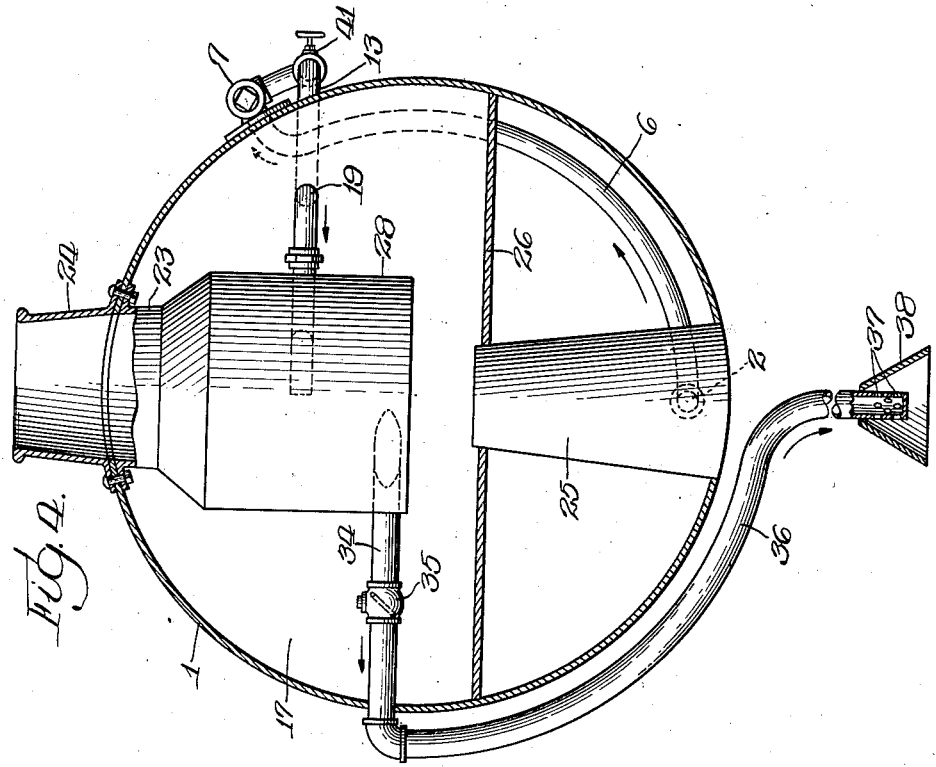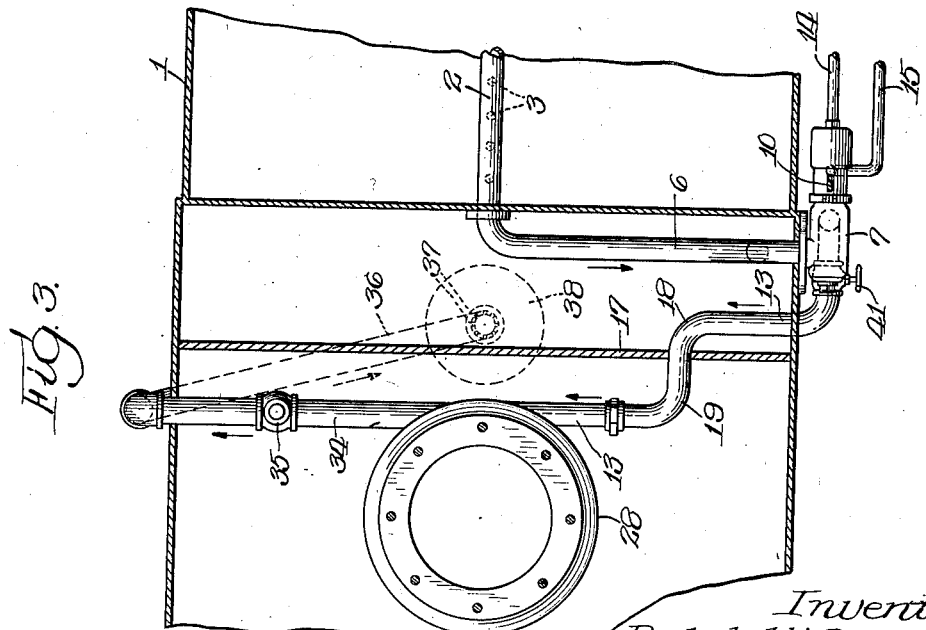

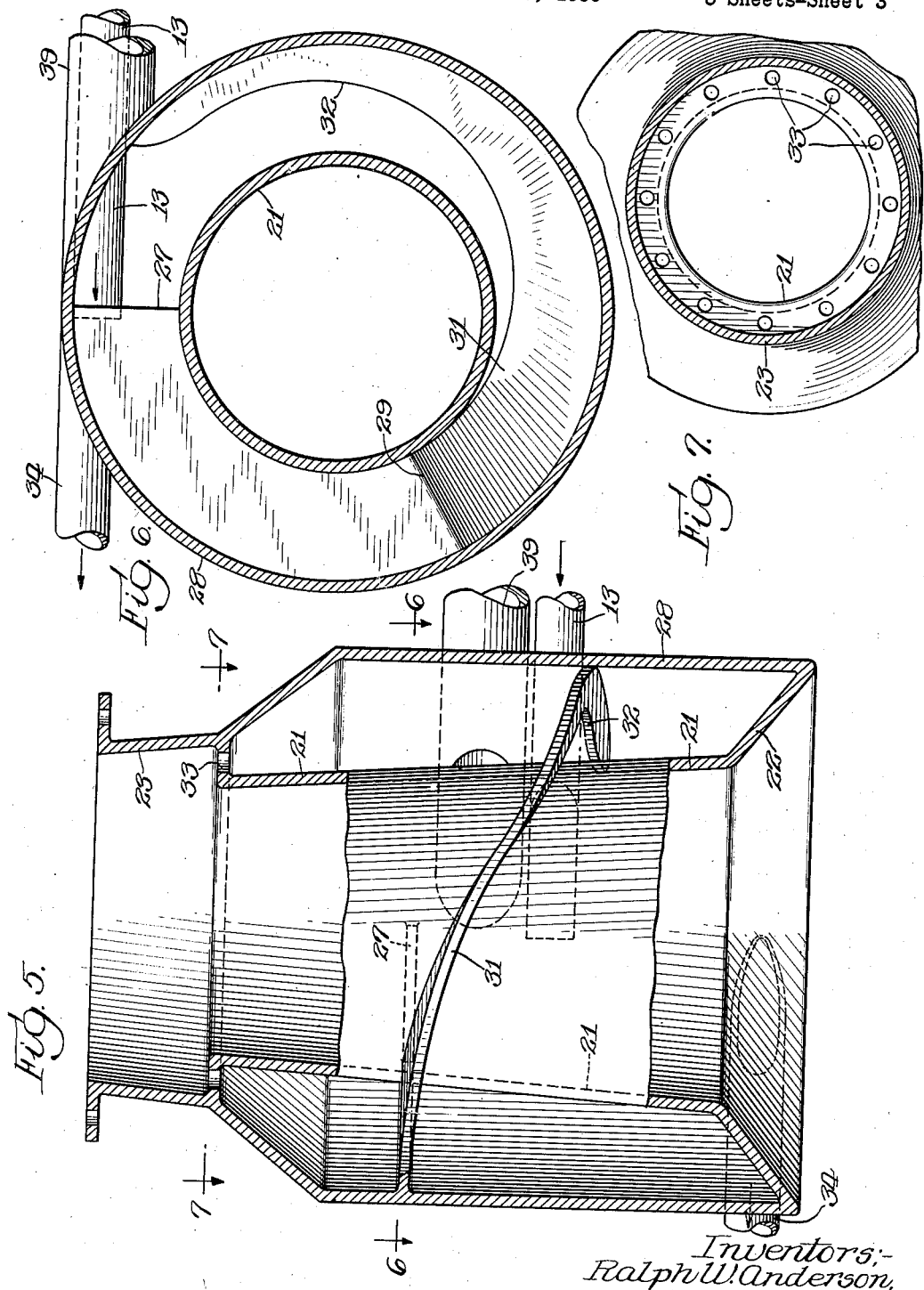

2,080,147

UNITED STATES PATENT OFFICE 2,080,147

SLUDGE REMOVAL APPARATUS

Verl E. McCoy, Chicago, Ill., and Ralph W. Anderson, Wauwatosa, Wis., assignors to Wilson Engineering Corporation, Chicago, Ill., a corporation of Delaware Application June 10, 1935, Serial No. 25,832

8 Claims. (Cl. 122—382)

This invention pertains to sludge removing apparatus for locomotives.

This invention is particularly concerned with the removal of the sludge from the boiler, the separation of the sludge into steam and water, and the discharge of these two components separately and at low pressure, the discharge being arranged so that it will not be harmful or dangerous to property or persons.

A particular object of the invention is to locate the separating means in a space where it will not encumber the exterior surfaces of the locomotive but will in fact be concealed and positioned where space is more plentiful, namely, surrounding the inner end of the locomotive stack.

Another object of the invention is to provide an improved form of separating device for removing the steam from the sludge and water.

A further object of the invention is to provide improvements in facilitating the withdrawal of the sludge from the boiler bottom, by employing one of the fire tubes as a sludge collecting pipe, after suitable modification thereof.

Other objects and advantages of the invention will be alluded to in the specification.

A single embodiment of the invention is shown for illustrative purposes in the drawings, Fig. 1 being a side elevation of a locomotive equipped with this invention, with portions in cross section;

Fig. 2 is an enlarged detail view partly in section and partly in elevation, showing a preferred form of blow-off valve used in the invention;

Fig. 3 is a horizontal sectional view taken on the line 3—3 of Fig. 1;

Fig. 4 is a vertical sectional view on the line 4—4 of Fig. 1, with portions of the apparatus in elevation;

Fig. 5 is in part a vertical central sectional view on the line 4—4 of Fig. 1, and in part an elevation of the separator;

Fig. 6 is a horizontal sectional view on the line 6—6 of Fig. 5, and

Fig. 7 is a horizontal sectional view on the line 7—7 of Fig. 5.

Referring now in greater detail to the drawings, there is shown in Fig. 1 a locomotive whose boiler is generally designated by the numeral 1. As will be well understood, a large number of fire tubes extend horizontally through this boiler, and need not be shown herein. However, as will be appreciated, a number of these fire tubes are located near the bottom of the barrel of the boiler, and in accordance with this invention one of them, indicated as 2, is utilized as the sludge collecting pipe or is replaced by a pipe constructed especially for the purpose. When this invention is installed on boilers already in service the fire tube is withdrawn from the boiler in the usual manner and is replaced by a pipe 2 having a series of holes 3 on its underside. Both ends of the pipe will be supported in the tube sheets as is usual for fire tubes and the rear end is blanked by means of a plug 4. A pipe 5 may also be connected, as shown, to extend down into the water leg to pick up sludge therefrom. The forward end of the tube will be connected with a pipe 6 leading up to the blow-off valve, generally indicated as 7. The tube sheet, therefore, serves as the sole support for the sludge collecting pipe, and, as will be recognized by those skilled in the art, this installation of this pipe is simple enough so that it can be accomplished in the round house, which therefore greatly decreases the expense of installation and causes no interference with the remaining fire tubes.

This blow-off valve will have an inlet port 8 in communication with the sludge collecting pipe, a valve seat 9 and on which the valve 11 normally seats. The outlet chamber of the valve is designated as 12 and to this is connected a pipe 13 hereinafter further described. The remainder of the structure of the valve, and the operation thereof, may be understood by reference to the patent to Verl E. McCoy No. 1,961,157 issued June 5, 1934, it being preferred at present to use the valve shown in that patent, although it should be understood that other valves may also be used in connection with this invention. This valve, being pneumatically controlled and capable of being opened by air pressure and also closed by air pressure, is connected by means of the pipes 14 and 15 to any suitable valve 16 capable of admitting compressed air to either of these pipes and relieving it simultaneously from the other pipe.

The pipe 13 connected to the outlet chamber of the valve extends into the front end compartment of the boiler and passes through the vertical baffle 17, at this point being provided with bends 18 and 19 which will allow for some expansion and contraction of this pipe, without disturbing its connection to the other parts of the apparatus. The pipe 13 is connected to deliver the sludge under boiler pressure tangentially into the centrifugal separator. It should be noted that the end of the pipe extends into the separator, as shown, and positively delivers the water along the wall of the separating chamber.

The centrifugal separator consists of an inner wall 21, an inclined bottom wall 22, and an upper extension 23, which latter is bolted or otherwise suitably secured in registration with the outside stack 24 of the locomotive. Thus a passage is provided for the upward flow of flue gases from the boiler and exhaust steam from the locomotive cylinders as discharged upwardly from the jet 25. No alteration in the usual position of the exhaust steam jet is required for the installation of this invention. The jet as usual will extend upwardly through the horizontal baffle 26.

In order to make more certain that the sludge delivered at high pressure through the pipe 13 into the separator may not to some extent escape upwardly along with the separating steam, we provide a deck 27 which, as shown in Fig. 6, extends solidly from the outer wall 28 of the separator to the inner wall 21, and furthermore extends horizontally from a position approximately over the end of the pipe 13 about one-third of the distance around the arcuate space between the walls 21 and 28, that is, to the point 29. Beyond this location the full width of the deck 27 is not required for preventing the water from being entrained along with the upwardly escaping steam. Accordingly, a rib 31 of gradually diminishing width is secured in sealed relation to the inner surface of the wall 28 and spirals downwardly and around the separator space to a level below the pipe 13 and somewhere near the end of that pipe (see Figs. 5 and 6). As the sludge flows along the wall 28, the steam will begin to separate therefrom and will escape upwardly through the aperture provided between the wall 21 and the inner margin 32 of the rib 31. The steam is allowed to expand considerably and therefore loses most of its pressure; it eventually escapes through a plurality of holes 33 into the stack where it mingles with the flue gases and exhaust steam from the jet, and is thereupon thrown high above the locomotive, when the locomotive cylinders are discharging exhaust steam. If the locomotive be idle, the steam separated from the sludge will naturally be carried to a considerable height as it mingles with the flue gases. In any event, the mingling of the steam with the flue gases will tend to evaporate any drops of moisture carried in the steam.

As the sludge flows around the circular interior surface of the separator, held to that surface by centrifugal force, the steam escapes upwardly and the water from which the steam has escaped eventually passes down and out through the pipe 34, which takes the water tangentially out of the separator, through the check valve 35 and pipe 36, down to some convenient position beneath the locomotive where the water may be discharged harmlessly and with little or no force upon the ground. To facilitate a harmless discharge of the water, preferably the end of the pipe 36 will be closed and near the end a plurality of holes 37 will be provided, which will cause the water to flow outwardly against the cone 38 which is secured upon the pipe and whose lower end is open.

As is well understood by those familiar with this art, the disposal of exhaust from the auxiliaries, such as air compressor pumps and feed water pumps, has always been a problem. The discharge of this steam, if to the atmosphere, must be accomplished in such a way as not to be a nuisance, and the large amount of condensation in the steam is also a factor which complicates the problem. Accordingly, we find it desirable to collect the exhaust from the auxiliaries and deliver it through the pipe 39 tangentially into the separator, preferably just above the entrance of the pipe 13. Thus the exhaust steam will escape upwardly through the stack along with the flue gases and other steam, and any condensation therein not vaporized by the heat in the separator may fall downwardly and drain out through the pipe 34.

As a precautionary measure, an ordinary valve 41 is provided in the pipe 13, so that whenever desirable the crew may close this line manually; for example, if the blow-off valve should become stuck in open position.

The apparatus is operated as follows: From time to time, as occasion may demand, the engine crew will operate the valve 16 to deliver air into the blow-off valve 7 to thereby open it. The sludge will then be expelled under boiler pressure into the apertures 3 of the pipe 2, thence through the pipe 6 and valve 7, and thence through the pipe 13 tangentially into the separator. The water will remain below the deck 27 and rib 31, spiraling downwardly along the wall 28 of the separator, while the steam will be released therefrom and escape upwardly through the apertures 33 into the locomotive stack, where it will rise above the locomotive and be discharged into the atmosphere with no annoyance to persons or property. Due to the opportunity for considerable expansion, the steam will be released with little remaining pressure, hence there will not be any considerable noise attendant upon this discharge of steam. The water freed from the steam will therefore be discharged through the pipe 34 with only a small amount of pressure and will be delivered to the ground without injury to the roadbed, or annoyance to persons or property near the locomotive. This discharge of the sludge and the separation of its steam and water components may be safely accomplished at any time when the locomotive is travelling, and even when the locomotive is standing in the yards or at passenger stations.

The draft created by the products of combustion flowing through the locomotive stack and the expelling of exhaust steam from the jet 25 creates a suction upon the interior of the separator, acting through the apertures 33. This suction aids in the rapid and more complete separation of steam from the water, thereby more efficiently relieving the withdrawn sludge water from boiler pressure and facilitating its safe discharge from the locomotive. Further, the suction, being exerted upon the steam separating chamber through the plurality of apertures 33, is thus uniformly applied to the separating chamber and consequently induces uniform separation of steam from the water, and minimizes the tendency to draw some water along with the steam and expel it above the locomotive. Of course the partition 27 and the rib 31 also aid in preventing entrainment of the water along with the separated steam. The placement of the apertures 33 in immediate proximity to the edges of the flue passage provided by the wall 21 facilitates the production of the desired suction.

The exhaust steam delivered into the separator through the pipe 13, more or less constantly, is also subjected to centrifugal motion which will throw out the heavier water particles and enable them to drain out through the pipe 34 while the heated condition of the separating chamber, due to the passage of flue gases therethrough, will tend to dry the steam which escapes upwardly through the stack. The constant suction, being maintained on the interior of the separating chamber, aids this effect.

By reason of the more thorough separation of steam from the water which is effected by this separator, the water which flows down to the ground through the pipe 34 will throw off very little steam when exposed to the atmosphere. This is a great advantage because an excessive amount of steam arising around the locomotive when standing might obstruct the vision of the engine men.

The drawings disclose, for the purpose of illustrating the invention, only the preferred embodiment thereof. It should be understood that the invention is subject to considerable variation and modification, within the limits of the invention as it is defined in the appended claims.

Having shown and described our invention, we claim:

1. In combination with a locomotive and the outer stack thereof, an exhaust steam nozzle below said stack, a centrifugal separator having a central passage therethrough and mounted inside the front end of the locomotive with said central passage registering with said stack, the lower end of said passage being spaced apart from and vertically above the nozzle, means for delivering sludge tangentially into the separator, means for withdrawing water from the separator, and means for delivering the steam separated from the sludge into the stack.

2. In combination with a locomotive and the outside stack thereof, a centrifugal sludge separator mounted beneath said outside stack and having a central passage connected to register with said outside stack for discharge of the flue gases, an arcuate chamber being provided in the separator surrounding said passage, means for delivering sludge into said chamber arranged to impart centrifugal motion thereto within the chamber, means for withdrawing water from the lower portion of said chamber, and means for delivering steam separating from the sludge within the chamber into said passage.

3. In combination with a locomotive and the outside stack thereof, a centrifugal separator mounted beneath said stack provided with a central passage connected to register with said stack, an arcuate chamber surrounding said passage, means for delivering sludge tangentially into the separating chamber to set up centrifugal motion of the delivered sludge therein, means for withdrawing water from the lower portion of said chamber, and means for admitting the separated chamber into said passage located so that the flow of gases or vapor through said passage will have a suction effect upon the interior of said chamber.

4. In combination with a locomotive and the outside stack thereof, a steam separator mounted beneath the stack and having a vertical passage extending therethrough in registration with said stack, means for withdrawing water from the separator, means for delivering sludge into the separator, and means in the separator cooperating with said delivering means for separating steam from said sludge, and means for delivering the separated steam into the upper portion of said passage.

5. In combination with a locomotive and the outer stack thereof, a centrifugal separator mounted beneath the stack and having a central vertical passage registering with said stack, means for delivering sludge tangentially into the separator, means for withdrawing water from the separator, an arcuate baffle in said separator extending from a point above the inlet of said sludge circumferentially within the separator for opposing upward entrainment of water with the separating steam, and means for delivering the steam separated from the sludge into the stack.

6. In combination with a locomotive and the outer stack thereof, a centrifugal separator mounted beneath the stack and having a central passage therethrough registering with the stack, means for delivering sludge tangentially into the separator, means for withdrawing water from the separator, a baffle within the separator extending from a position above the inlet of the sludge circumferentially within the separator and having a progressively diminishing radial width as it extends further in the direction of flow of the water, and means for delivering the steam separated from the sludge into the stack.

7. In combination with a locomotive and the outer stack thereof, a centrifugal separator mounted beneath the stack and having a central passage therethrough registering with the stack, means for delivering sludge tangentially into the separator, means for withdrawing water from the separator, a baffle within the separator extending from a position above the inlet of the sludge circumferentially within the separator and having a progressively diminishing radial width as it extends further in the direction of flow of the water, said baffle spiraling downwardly as it diminishes in width, and means for delivering the steam separated from the sludge into the stack.

8. In combination with a locomotive and the outside stack thereof, means for separating steam from sludge and provided with a central vertical passage mounted in registration with said stack, said passage serving as the flue for the locomotive products of combustion, a sludge-collecting pipe positioned in the barrel of said boiler near the bottom thereof and protruding through the front fire tube sheet, means including a conduit and a valve controlling the same located at the front end of the locomotive connected with said pipe and extending through the locomotive front end space forwardly of said tube sheet for delivering sludge to said separating means, means for withdrawing water from the separator, and means for delivering the separated steam into said stack.

RALPH W. ANDERSON.
VERL E. McCOY.